METHODS OF APPLYING DOPING COMPOSITIONS TO BASE MATERIALS

Filed Oct. 23, 1965

INVENTORS
D.C. LEPIANE
H.N. ZIMMERMAN
BY J. L. Landis
ATTORNEY

United States Patent Office 3,354,005
Patented Nov. 21, 1967

3,354,005

METHODS OF APPLYING DOPING COMPOSITIONS TO BASE MATERIALS

Donald C. Lepiane, Reading, and Henry N. Zimmerman, Kutztown, Pa., assignors to Western Electric Company, Incorporated, New York, N.Y., a corporation of New York Filed Oct. 23, 1965, Ser. No. 503,586
9 Claims. (Cl. 148—186)

Figure 1:
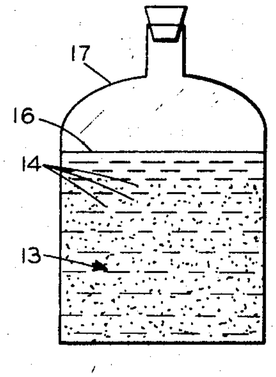

This invention relates generally to methods of applying a doping composition to a base material, and more particularly to improved methods of applying a predetermined amount of a particulate doping composition to a surface of a body of base material preparatory to a diffusion operation. Accordingly, the general objects of the invention are to provide new and improved methods of such character.

In the manufacture of diffused junction semiconductors, one prior-known process of diffusing a doping agent such as boron or phosphorus into a surface region of a semiconductive slice, such as silicon or germanium, is known as the "paint-on" process. In that process, the surface of the slice is painted with a composition containing particles of a doping composition, such as boron oxide ($B_2O_3$) or phosphorus pentoxide ($P_2O_5$), in a carrier or vehicle such as ethylene glycol monomethyl ether, plus water in the case of phosphorus pentoxide. The doping composition must be one which can be decomposed to yield the elemental doping agent, such as boron or phosphorus, upon heating in contact with the slice, thereby permitting diffusion of the doping agent into the semiconductor. The carrier must be one which is thermally decomposable or vaporizable into harmless constituents at a temperature below the diffusion temperature.

One difficulty which arises in using the paint-on process is in obtaining a uniform painted film having a predetermined thickness, so as to permit uniform diffusion of a predetermined amount of the doping agent across the surface of the slice. Accordingly, another object of the invention is to provide an improved method of applying a suspension of a particulate doping composition and an organic carrier to a slice to be doped, in which the amount of the doping composition applied to the slice can be carefully controlled and is always uniform over the surface area to be treated.

With the foregoing and other objects in view, the first step in a method according to the invention is to form a suspension of particles of the doping composition in a liquid organic carrier of a type which can be solidified and which, in solid form, can be vaporized at a temperature below the diffusion temperature. The next step in the process is to solidify the suspension to form a solid composite mass of the particles suspended in a matrix of the solid form of the carrier. Next, a predetermined portion of the solid mass is placed on the surface of the body of base material to be doped, and the assembly is then heated to drive off the carrier, after which the assembly is further heated to cause the doping agent to diffuse into the surface of the base material. The size of the portion of the solid mass of carrier plus doping composition is selected to provide the desired amount of suspended doping agent for the particular diffusion operation.

In accordance with certain embodiments of the invention, the base material is silicon or germanium and the doping composition is boron oxide or phosphorus pentoxide. Preferably, the carrier consists of a solution of an organic resin in at least one volatile solvent. A preferred material is collodion, a solution of pyroxylin in ether and alcohol. In this instance, the finely divided doping agent is simply mixed with collodion to form a suspension, from which the solvents are quickly evaporated to form a solid, relatively tough mass of pyroxylin containing the doping compound uniformly suspended throughout the mass. This mass may then be cut into individual pieces of the size required for the diffusion operation.

Other objects, advantages and features of the invention will be apparent from the following detailed description of specific embodiments and examples thereof, when taken in conjunction with the appended drawings, wherein FIGS. 1–5 are schematic diagrams illustrating the sequence of steps in a method according to one specific embodiment of the invention.

Figure 3:
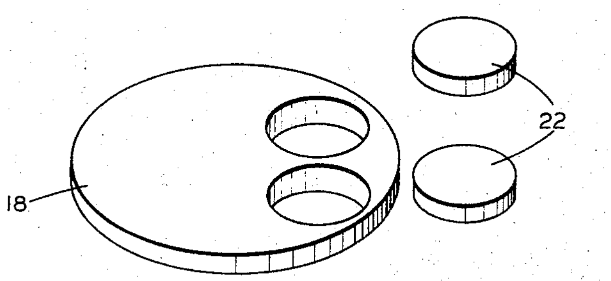
Figure 4:
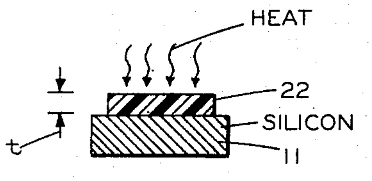
Figure 5:
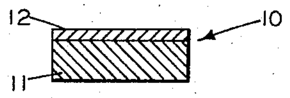

Referring first to FIG. 5, the specific embodiment of the process illustrated is a process for making a diffused silicon slice 10 from which a plurality of diode wafers can be cut in conventional fashion. The diffused slice 10 consists of a slice 11 of N-type silicon having a diffused surface region 12 of P-type conductivity. FIGS. 1–5 illustrate a preferred method of diffusing a P-type doping agent, such as boron, into the surface of the slice 11 to form the diffused surface region 12; however, the same process steps can be used to diffuse an N-type doping agent, such as phosphorus, into a P-type slice, or to diffuse any doping agent into any body of base material which is susceptible to diffusion.

Referring now to FIG. 1, the first step in the process is to form a suspension 13 of particles 14—14 of a doping composition in a liquid organic carrier 16. The doping composition must contain the desired doping agent and must be capable of heating to a temperature sufficient to cause the doping agent to diffuse into the surface of the base material. The selection of particular doping compositions for diffussion into particular base materials is per se known in the art, and is essentially similar to the prior-art paint-on process. In the specific example, for boron diffusion into silicon, the preferred doping composition is boron oxide ($B_2O_3$), which can be decomposed upon heating to liberate elemental boron for the diffusion operation.

The carrier 16 must be one which, in liquid form, is capable of forming the suspension 13 of the particles 14—14 of the doping composition; which can readily be solidified; and which, in solid form, can be vaporized or decomposed at a temperature below the diffusion temperature into gases which are inert with respect to the diffusion operation. While various materials meeting these criteria may be employed, it is preferred to use a solution of an organic resin in one or more volatile solvents, which may be solidified rapidly by evaporation of the solvent. One material which is extremely well suited to the practice of the invention is collodion, a solution of pyroxylin (a mixture of lower cellulose nitrates) in ether and alcohol.

Referring again to FIG. 1, the suspension 13 of doping composition particles 14—14 in the liquid carrier 16 may be prepared simply by adding a desired quantity of the particles 14—14 to a predetermined amount of the liquid in a container 17. Where the carrier 16 contains volatile solvents, such as collodion, the container should be closed to avoid premature evaporation of the solvents. In the case of a suspension of $B_2O_3$ particles in collodion, it is not necessary to stir or agitate the suspension 13 continuously; it is only necessary to shake the container 17 before each use to achieve a uniform suspension. For other applications, the suspension may be continuously stirred or otherwise agitated where necessary to maintain a uniform suspension.

The concentration of the doping composition in the suspension 13 may be varied over relatively wide limits depending on the specific materials chosen and the inherent capability of the carrier to maintain the particles in suspension. It is advantageous to use as high a concentration of doping composition as can readily be achieved, as this minimizes the total amount of the carrier necessary to practice the process. In doping applications using suspensions of $B_2O_3$ or $P_2O_5$ in collodion, the preferred concentration is between 15 and 30% by weight of the particles.

Figure 2:
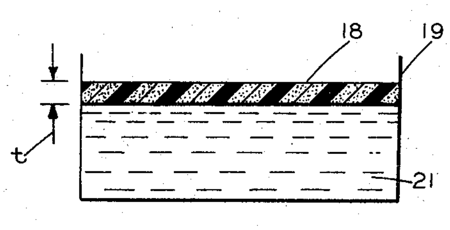

Referring now to FIG. 2, the next step in the process is to solidify the suspension 13, or a portion thereof, to form a solid composite mass, preferably in the form of a solid film 18, consisting of the particles 14—14 suspended in a matrix of the solid form of the carrier. Of course, the way the carrier is solidified (heating, cooling, exposure to the atmosphere) depends entirely on its properties; where a solution of a resin in a solvent is employed, the carrier is set by evaporation of the solvent to form a solid composite mass of the resin with the particles of doping composition suspended therein. In the case of collodion, it is only necessary to expose the suspension to the atmosphere, at which time the solvents evaporate quickly converting the exposed quantity of the suspension to pyroxylin.

A preferred method of solidifying the suspension 13 is illustrated in FIG. 2, in which a preselected volume of the suspension of $B_2O_3$ particles in collodion, after shaking in the container 17, is poured into an open container 19 of water 21. When this is done, the suspension 13 initially floats on the surface of the water, but the solvents evaporate substantially immediately leaving a film 18 of solid pyroxylin, containing the particles 14—14, floating on the surface of the water. Due to the extreme volatility of collodion, the water may be at room temperature and no heating is necessary in this step. Where solutions of other resins and solvents are used, it might be necessary to heat the water 21, or to use a liquid other than water. The important properties of the liquid used in the film-forming operation are that it be immiscible with the suspension 13, and one on which the suspension will float.

The thickness "$t$" of the composite film 18, of course, is dependent upon the size of the container 19 and the volume of the suspension 13 poured in. In practice, it is preferred to select the volume of the suspension 13 such that the thickness $t$ is equal to the thickness of a slice of resin plus particles desired for the particular diffusion operation, which in turn is dependent on the concentration of the doping composition in the suspension 13. The essential factor in calculating the volume is that the film 18 must provide the required amount of available doping agent per unit area for the diffusion operation, thicker films being required to provide a given amount of doping agent when the concentration of particles in the suspension is lower.

The significant advantages of this film-forming method of solidifying the carrier 16 are that the evaporation and setting take place very rapidly when a thin film is used, the thickness $t$ of the film 18 is extremely uniform over the entire surface of the water 21, and no cutting of the film 18 is required in the vertical direction, as viewed in FIG. 2. However, other methods of solidifying the suspension 13 may also be employed, such as by solidifying the carrier 16 in a suitable container or mold, to form an ingot or rod of a desired shape and size, which is later cut or sliced into individual slices of the required thickness $t$.

While it is technically feasible to form the solid mass of particles and carrier to exactly the dimensions required for the diffusion operation, it is usually more practical to form a much larger mass and to cut the mass into a plurality of individual discs 22—22 (FIGS. 3 and 4) of the required size. In the preferred embodiment illustrated in FIG. 2, where the film 18 of the correct thickness $t$ is formed, the solid film 18 is removed from the container 19 and is merely cut into a number of individual discs 22—22, as depicted in FIG. 3, of the requisite length and width. In the specific example illustrated, the discs 22—22 have a diameter slightly less than the diameter of the silicon slice 11, as illustrated in FIG. 4. The surface configuration and dimensions of the discs 22—22 are dictated by the particular area of the surfaces of the slices which is to be diffused.

Referring to FIG. 4, in which the heat-treating operation is diagrammatically illustrated, the next step in the process is to place one of the discs 22—22 on the surface of the slice 11, after which the assembly is heated to the required diffusion temperature as previously described. As the assembly is heated, the organic carrier is driven off at a temperature below the diffusion temperature, leaving the slice 11 coated with the particles of the doping composition. Upon further heating, the doping composition decomposes to release the elemental doping agent, which diffuses into the surface of the slice 11 in a manner well known in the art, to form the diffused layer 12 in the surface of the slice 11 as illustrated in FIG. 5. In the specific example given, the semiconductor device to be formed is a simple boron-diffused silicon diode; however, transistors may be made in accordance with the same techniques by diffusing another doping agent either into the undiffused surface of the slice or into a limited region of the previously doped region 12, as is well-known in the art.

While the slices 11—11 may be diffused singly, as depicted in the simplified example illustrated in FIG. 4, it is customary to stack a large number of slices 11—11 to be treated in a furnace so that diffusion may take place simultaneously. When this is done, it is advantageous to mount the assemblies shown in FIG. 4 in pairs with the discs 22—22 of carrier plus particles facing each other. Preferably, the surfaces to be diffused of each pair of slices are separated from each other by particles of a refractory material, such as aluminum oxide granules. The refractory material must be one which is not decomposed or otherwise affected at the diffusion temperatures, so that the particles prevent sticking of the slices together. Advantageously, in accordance with a specific embodiment of the invention, a minor percentage of aluminum oxide granules are also mixed with the collodion in the first step, and form a part of the suspension 13 in FIG. 1. When this is done, the aluminum oxide granules necessary to separate each pair of slices 11—11 are already in place in the disc 22. This eliminates a separate step used in the prior art paint-on process, of sprinkling the freshly painted coatings with aluminum oxide particles.

*Example*

In accordance with one typical example of the invention, 20 grams of boric acid anhydride ($B_2O_3$) powder having an average particle size of approximately 80 mesh were added to 100 cc. (approximately 70 grams) of collodion solution in a closed container, as viewed in FIG. 1. In addition, 3 grams of $Al_2O_3$ granules having an average particle size of approximately 5 microns were added. This provided, upon shaking, a uniform suspension of the particles in the collodion, containing approximately 22% by weight of $B_2O_3$ particles and 3% by weight of $Al_2O_3$ particles.

Next, approximately 4 cc. of this suspension were poured slowly onto the surface of a body of water 21 at room temperature, as viewed in FIG. 2, in a cylindrical container 19 having a diameter of approximately 2 inches. The suspension formed a uniform film floating on the water, which solidified within a matter of a few minutes into a solid disc having a fully hardened surface skin. Next, a small hole was punched along the edge of the disc and some of the water was poured out to permit air to get under the disc and fully harden the same into a hardened, relatively tough film of pyroxylin containing the particles of $B_2O_3$, and $Al_2O_3$, as depicted by the numeral 18 in FIG. 2. The thickness of this solid film 18 was approximately 16 mils in the example. This film was then removed from the container and was cut into a number of generally circular discs 22—22 as required for the diffusion operation. In one typical example, ⅞ inch diameter discs 22—22 were cut from the film 18 and placed on a surface of N-type silicon slices 11—11, as viewed in FIG. 4, having a diameter of 1 inch and a thickness of 7 mils. The assemblies were then heat treated at a temperature of approximately 1250° C. for about 12 hours, to provide a P-type boron diffused region 12 in the surface of each slice having a depth of approximately 1.4 mils. In general, the preferred diffusion temperature is between about 1235 and 1320° C.

While various specific embodiments and examples of the invention have been described in detail hereinabove, it will be apparent that various modifications may be made from the specific details described without departing from the spirit and scope of the invention.

What is claimed is:

1. In a process of diffusing a doping agent into a surface of a body of base material, wherein solid particles of a doping composition containing the doping agent are applied to the surface of the base material and heated to a temperature sufficient to cause the doping agent to diffuse into the surface of the base material, an improved method of applying a predetermined amount of the doping composition to the body of base material, which comprises:

(a) forming a suspension of particles of the doping composition in a liquid organic carrier of a type which can be solidified and which, in solid form, can be vaporized at a temperature below the diffusion temperature;

(b) solidifying the suspension to form a solid composite mass of the particles suspended in a matrix of the solid form of the carrier; and (c) placing a predetermined portion of the solid mass on the surface of the body of base material, the size of the portion being selected to provide the desired amount of suspended doping agent for the diffusion operation, after which the assembly may be heated to drive off the carrier and cause the doping agent to diffuse into the surface of the base material.

2. The method as recited in claim 1, wherein the carrier consists of a solution of an organic resin in at least one volatile solvent, and the solidification step is performed by evaporating the solvent to form a solid composite mass of the resin with the particles of the doping composition suspended therein.

3. The method as recited in claim 2, wherein the carrier is collodion.

4. The method as recited in claim 2, wherein the evaporating step is performed by pouring a preselected volume of the suspension into a container of an immissible liquid on which the suspension will float, at a temperature such that the solvent evaporates quickly, leaving a solid film of the resin containing the doping composition floating on the surface of the liquid, the volume of the suspension being selected in accordance with the size of the container such that the thickness of the film so formed is equal to the thickness of the portion of resin plus doping composition required for the diffusion operation.

5. The method as recited in claim 1, wherein:

the solid composite mass formed in step (b) is larger than the portion required in step (c); and the mass is cut into individual discs of the size required for the diffusion operation prior to step (c).

6. The method as recited in claim 1, wherein the base material is selected from the group consisting of silicon and germanium, and the doping composition is selected from the group consisting of boron oxide and phosphorus pentoxide.

7. The method as recited in claim 1, including the additional step of adding particles of a refractory material to the suspension formed in step (a).

8. The method as recited in claim 7, wherein the refractory material is aluminum oxide.

9. In a process of diffusing a doping element selected from the group consisting of boron and phosphorus into a surface of a silicon slice, wherein particles of an oxide selected from the group consisting of boron oxide and phosphorus pentoxide are applied to the surface of the silicon slice and heated to a temperature sufficient to decompose the oxide and to diffuse the doping element into the surface of the slice, an improved method of applying a predetermined amount of the oxide to the slice, which comprises:

(a) forming a suspension of the oxide in collodion, the suspension containing between 15 and 30% by weight of the particles;

(b) exposing the suspension to the atmosphere to allow evaporation of the solvents from the collodion and to convert the suspension into a solid composite mass of pyroxylin containing the oxide particles suspended therein;

(c) cutting the solid composite mass into individual pieces of a size such that each contains that amount of suspended oxide required for diffusion into one silicon slice; and (d) placing one such piece against the surface of a slice to be doped, after which the assembly may be heated to a temperature of the order of 1235 to 1320° C. for a sufficient time to vaporize the pyroxylin, to reduce the oxide to elemental form, and to diffuse the doping element into the surface of the slice.

References Cited

UNITED STATES PATENTS

| | | | |
|---|---|---|---|
| 3,084,079 | 4/1963 | Harrington | 148—188 |
| 3,183,130 | 5/1965 | Reynolds | 148—188 |
| 3,247,032 | 4/1966 | Griswold | 148—188 |

HYLAND BIZOT, *Primary Examiner.*